(No Model.)
J. STRUBLE.
BEVEL.
No. 361,243. Patented Apr. 12, 1887.
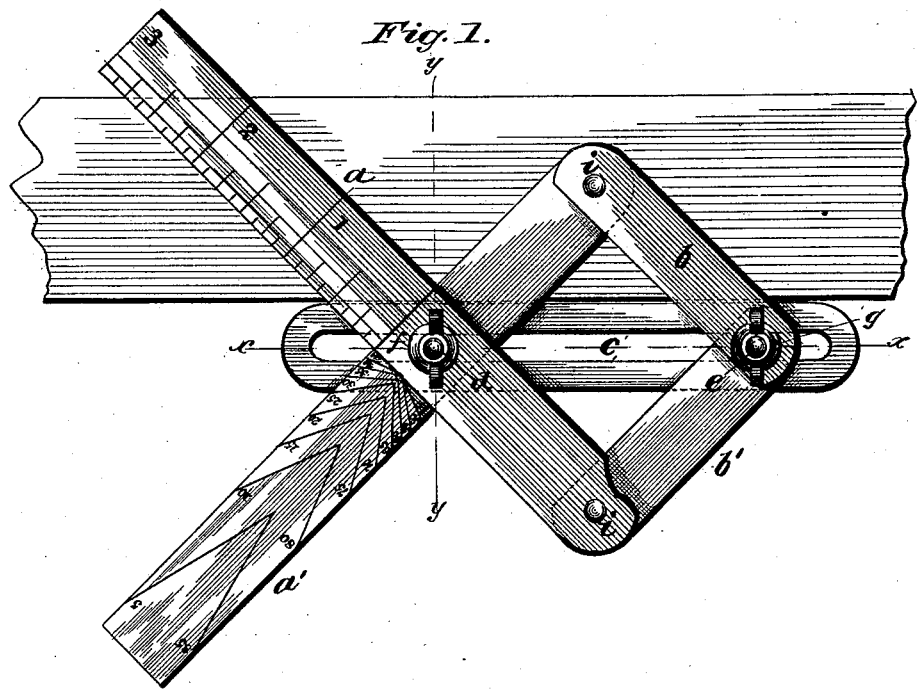
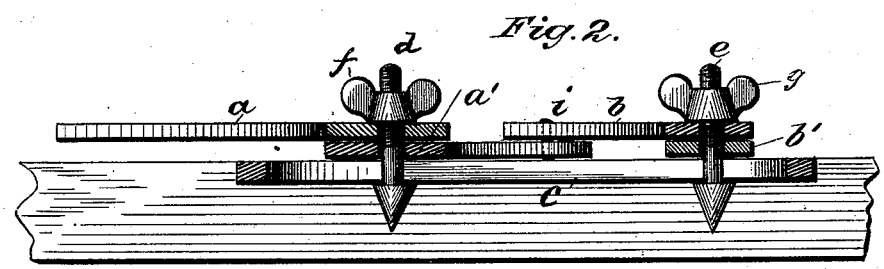
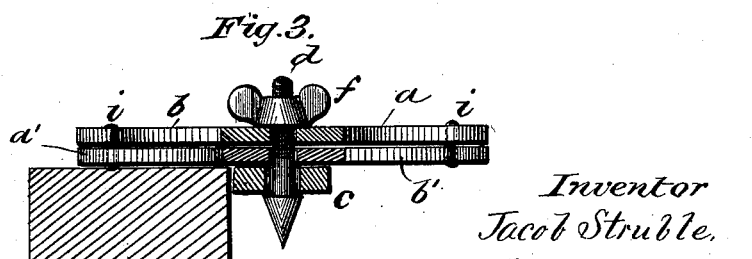
Witnesses:
B. Fugitt
P. M. Masi.
Inventor
Jacob Struble.
by
Anderson & Smith
Attorneys.

UNITED STATES PATENT OFFICE.

JACOB STRUBLE, OF SIOUX CITY, IOWA.

BEVEL.

SPECIFICATION forming part of Letters Patent No. 361,243, dated April 12, 1887.

Application filed November 4, 1886. Serial No. 217,991. (No model.)

*To all whom it may concern:*

Be it known that I, JACOB STRUBLE, a citizen of the United States, and a resident of Sioux City, in the county of Woodbury and State of Iowa, have invented certain new and useful Improvements in Squares and Bevels; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of a plan view. Fig. 2 is a longitudinal vertical section on line $x\,x$, Fig. 1. Fig. 3 is a transverse vertical section on line $y\,y$, Fig. 1.

My invention relates to squares and bevels; and it consists in the construction and novel combination of parts, as hereinafter described and claimed.

Referring by letter to the accompanying drawings, $c$ designates the slotted base-plate or elongated flat link, to which the adjustable portion of the device is connected by screw-bolts $d\,e$, having nuts $f\,g$ turned thereon to permit any necessary adjustment of the arms of the device.

$b$ and $b'$ designate the two shorter arms of the instrument, and $a\,a'$ are the longer arms thereof, which longer arms are crossed one upon the other and connected by the screw-bolt $d$ and nut $f$. The shorter arms $b\,b'$ are connected to the inner ends of the longer arms $a\,a'$ by rivets $i\,i$, and the outer ends of the shorter arms are connected to each other and to the slotted base-plate by the screw-bolts $e$ and the nut $g$, so that the several arms named are adjustable on the slotted base-plate, the adjustment being effected by loosening the nuts and moving the arms in or out, as may be necessary, and again tightening the nuts.

The longer arm $a$ is graduated into inches and fractions of inches, and the longer arm $a'$ is graduated into degrees of a circle, from five to forty-five degrees along one edge and from forty-five to eighty-five degrees along the other edge. Thus it will be seen that any desired bevel may be indicated on a piece of stock, the length of the bevel being at the same time made known.

In operation, one edge of the slotted strip $c$ is placed against the edge of the stock to be marked, as more fully shown in Fig. 1 of the drawings, and after the screws have been moved to the desired point in this slot the nut $g$ is tightened, so as to fix the short arms with respect to the said slotted strip. The long arm $a$ is then moved over the arm $a'$ upon its pivot until the edge of the former has been brought in line with the desired angle-mark thereon, when, by means of a pencil or other marking device, the angle may be indicated upon the stock. It will be observed that the angle-marks run obliquely in opposite directions, their bases coinciding with the longitudinal central line of the arm. It will thus be observed that bevels or miters may be formed at angles of any degree.

I make the heads of the bolts pointed, so that I may use the device as compasses or dividers.

Having described this invention, what I claim, and desire to secure by Letters Patent, is—

1. The combination, with the slotted base-plate or link, of the pivoted shorter arms and the longer arms provided with graduation-marks of inches and fractions thereof and degree-marks of a circle from five to eighty-five degrees, substantially as specified.

2. The combination, with the slotted link, of a bevel having one of its pivotal branches provided with angular indications running obliquely in opposite directions from the longitudinal middle of the branch, and a pivoted arm adapted to be moved over and secured with relation to said branch, substantially as specified.

In testimony whereof I affix my signature in presence of two witnesses.

JACOB STRUBLE.

Witnesses:
DANIEL H. SULLIVAN,
DORSEY TAYLOR.